United States Patent
Shimomura et al.

(10) Patent No.: US 7,487,081 B2
(45) Date of Patent: Feb. 3, 2009

(54) SENTENCE CREATION APPARATUS AND CREATION METHOD

(75) Inventors: Hideki Shimomura, Kanagawa (JP); Masahiro Fujita, Saitama (JP); Keiichi Yamada, Tokyo (JP); Ugo Di Profio, Tokyo (JP); Justin McKay, Tokyo (JP); Kimberly Binsted, Tokyo (JP)

(73) Assignees: Sony Corporation, Tokyo (JP); Binsted-McKay Yugen-Kaisha, tokyo (JP)

(*) Notice: Subject to any disclaimer, the term of this patent is extended or adjusted under 35 U.S.C. 154(b) by 759 days.

(21) Appl. No.: 10/416,609

(22) PCT Filed: Sep. 13, 2002

(86) PCT No.: PCT/JP02/09460

§ 371 (c)(1),
(2), (4) Date: Nov. 4, 2003

(87) PCT Pub. No.: WO03/025787

PCT Pub. Date: Mar. 27, 2003

(65) Prior Publication Data

US 2004/0088327 A1    May 6, 2004

(30) Foreign Application Priority Data

Sep. 14, 2001   (JP)   ............................. 2001-279068

(51) Int. Cl.
*G06F 17/28*   (2006.01)
(52) U.S. Cl. .............................................. 704/4; 704/2
(58) Field of Classification Search ........................ None
See application file for complete search history.

(56) References Cited

OTHER PUBLICATIONS

Binsted et al., A symbolic description of punning riddles and its computer implementation, Proceedings of the Twelfth National conference on Artificial Intelligence, Jun. 2, 1994.*
Toshihiko Yokokawa, "Cho'on Ruiji ni Motozuku Dajare Koho no Jido Seisei", Japan Society for Fuzzy Theory and Systems Dai 10 Kai Intelligent System Symposium Koen Ronbunshu, Oct, 28, 2000, pp. 253-256.
Binsted K., Ritche G., An implemented model of punning riddles, Proceedings of the Twelfth National conference on Artificial Intelligence, 1994, vol. 1, pp. 633 to 638.

* cited by examiner

*Primary Examiner*—Richemond Dorvil
*Assistant Examiner*—Leonard Saint Cyr
(74) *Attorney, Agent, or Firm*—Frommer Lawrence & Haug LLP; William S. Frommer; Thomas F. Presson (57) ABSTRACT

A sentence generating method and apparatus for generating a joke sentence set having a dual meaning. A predetermined word in a selected first idiom is stored in a W list. A word of analogous sound having the pronunciation same as or analogous with the word in the W list and also being of the same word class as the word in the W list is stored in a RW list. It is then checked whether or not the subject word stored in the P list has a semantic relationship with the word of the analogous sound in the RW list. If the result of check is affirmative, a first joke sentence having the subject word in the P list and composed of the subject word of the P list and the first idiom is generated. A second idiom, corresponding to the first idiom, in which the word in the W list is replaced by the word of the analogous sound in the RW list, is generated, and a second joke sentence composed of the subject word of the P list and the second idiom is generated.

8 Claims, 5 Drawing Sheets

| id | idiom | adjective |
|---|---|---|
| 1 | need dough | poor, desperate, hard-up, insolvent |
| 2 | take a bow | performing, entertaining |
| . . . | . . . | . . . |

FIG.4

| word | phonetic | pos | relating words |
|---|---|---|---|
| bow | bau | noun | ..., ..., ..., |
| bough | bau | noun | branch, tree, wood |
| chef | ... | ... | food, cooking, cuisine, kitchen |
| lumberjack | ... | ... | forest, axe, saw, wood, logs |
| stupid | stjupid | adjective | ..., ..., ..., |
| need | nid | verb | ..., ..., ..., |
| kneed | nid | verb | ..., ..., ..., |
| fool | ... | ... | food, mousse |
| take | teik | verb | ..., ..., ..., |
| ... | ... | ... | ..., ..., ..., |

FIG.5

SENTENCE CREATION APPARATUS AND CREATION METHOD

TECHNICAL FIELD

This invention relates to an apparatus and a method for generating a sentence, such as joke sentence, having a dual meaning, a recording medium for having a program used in the sentence generating apparatus, and to such program.

BACKGROUND ART

In these days, several instances of a joke sentence generating system, generating a joke sentence by exploiting a computer, have been reported. For example, instances of [JAPE] for automatically generating a riddle, an answer for which is a pun (BOKE for generating puns in Japanese), and the [Class B Organization] for generating a pun sentence, in which a word in a sentence is replaced by another word having an analogous pronunciation, have been reported. The pun sentence is a sentence, analogous in nature, produced by combining plural words having the same or analogous pronunciation, and is a joke sentence having humorous effects.

The joke sentence herein means a sentence with elements of joke, laughing matter and humor.

The joke sentence generating system by the conventional computing processing suffers from a drawback that, in connection with a word selected from a certain idiom, two sentences of respective different meanings, with the common subject, cannot be generated.

For example, the [BOKE (JAPE)] generates a riddle sentence: "パンはパン でもぺっちゃんこ のパンは何になる?[In various kinds of breads, what is the collapsed pan?, uttered as panwa pandemo pecchankonopanwa nanininaru?]"and an answer sentence: "パンク[It's puncture., uttered as panku]". This is an instance in which the word "パン[bread, uttered as pan]", of the basic sentence: "パンはパン、[In various kinds of breads, ..., uttered as panwa pan ...]" is replaced by "パンク(PANKU)" indicating a state of an object, by combining the phonetic [PAN] of the "パン"and the meaning of "ぺっちゃんこ[collapsed, uttered as pecchanko]" indicating another state of an object.

That is, the "パン"of the basic sentence is a name of a real object so that it is not a joke sentence and only the generated "パンク"is the joke sentence. However, a sentence made up solely by the "パンク"does not make sense.

On the other hand, "B級機関"(class B organization) generates a sentence exemplified by "打ち上げ鼻血[shooting up of nasal hemorrhage, uttered as uchiage hanji]". This is an instance in which the word "花火[fireworks, uttered as hanabi]" in the basic sentence "打ち上げ花火" [shooting up of fireworks, uttered as uchiage hanabi]", is replaced by "鼻血"[nasal hemorrhage, uttered as hanaji]", having the analogous pronunciation [HANAJI] with respect to the [HANABI] of the "花火".

That is, the "打ち上げ花火" of the basic sentence is a name of a real object so that it is not a joke sentence and only the generated "打ち上げ鼻血"is the joke sentence. However, a sentence made up solely by the "打ち上げ鼻血"does not make sense.

That is, as compared to the basic sentence, having the ordinary meaning, the generated joke sentence is simply analogous with the basic sentence in pronunciation and does not make sense. In this case, this failure in making sense gives a humorous effect. Stated differently, there is no semantic relationship between the basic sentence and the joke sentence generated by the conventional computing processing. Specifically the combination of the two sentences cannot be said to be a joke sentence having the dual meaning.

DISCLOSURE OF THE INVENTION

It is therefore an object of the present invention to provide a novel sentence generating apparatus and method free from the problems inherent in the above-described conventional joke sentence generating system.

It is another object of the present invention to provide a sentence generating apparatus and method in which joke sentences having dual meanings may be generated by computing processing, a recording medium for having a program used for the sentence generating apparatus, and the program.

For accomplishing the above objects, the present invention provides a sentence generating apparatus comprising recording means for having a plurality of idioms, a plurality of words, the meanings of the words, word classes of the words, and phonetics of the words, selecting means for reading out a preset idiom from the recording means and for selecting a preset word contained in the read-out idiom as a first word, first readout means for selecting, from the recording means, a word having the pronunciation same as or analogous to the selected first word and being of the same word class as the selected first word, based on the phonetics and the word class of the-recorded first word, and reading out the selected word as a second word, second readout means for selecting the word, determined to have a semantic relationship with the read-out second word, from the recording means, based on the meaning of the of the recorded second word, and for reading out the selected word as a third word, idiom generating means for generating an idiom corresponding to the read-out idiom except that the selected first word among the words making up the read-out idiom is replaced by the read-out second word, and sentence generating means for generating a first sentence, composed of the third word and the read-out idiom, with the read-out third word as a subject of the sentence, and for generating a second sentence, composed of the third word and the generated idiom, with the read-out third word as a subject of the sentence.

Preferably, the recording means further has a plurality of adjectives pertinent to the recorded idioms, there being provided third read-out means for reading out the adjectives pertinent to the selected idioms from the recording means, the sentence generating means generating the first sentence made up by the third word, read-out idiom and the read-out adjective and also generating the second sentence made up by the third word, generated idiom and the read-out adjective.

The present invention also provided a method for generating a joke sentence by a sentence generating apparatus including recording means for having a plurality of idioms, a plurality of words, the meanings of the words, word classes of the words, and phonetics of the words, in which the method comprises a selecting step of reading out a preset idiom from the recording means and selecting a preset word contained in the read-out idiom as a first word, a first readout step of selecting, from the recording means, a word having the pronunciation same as or analogous to the selected first word and being of the same word class as the selected first word, based on the phonetics and the word class of the recorded first word, and reading out the selected word as a second word, a second readout step of selecting a word, determined to have a semantic relationship with the read-out second word, from the recording means, based on the meaning of the of the recorded second word, and reading out the selected word as a third word, an idiom generating step of generating an idiom corresponding to the read-out idiom except that the selected first word among the words making up the read-out idiom is replaced by the read-out second word, and a sentence generating step of generating a first sentence, composed of the third word and the read-out idiom, with the read-out third word as a subject of the sentence, and for generating a second sentence, composed of the third word and the generated idiom, with the read-out third word as a subject of the sentence.

The present invention also provides a sentence generating apparatus for generating a sentence comprising selecting means for selecting a first word from a preset medium, detection means for selecting a second word having the pronunciation same as or analogous to the first word selected by the selecting means and being of the same word class as the first word, subject selecting means for selecting a third word as a subject having a semantic relationship with the first word and/or with the second word and sentence generating means for generating a first sentence employing the first word, and a second sentence employing the second word in substitution for the first word, using the third word as a subject of the sentences.

The present invention also provides a recording medium for having a computer-readable program for a sentence generating apparatus including recording means for having a plurality of idioms, a plurality of words, the meanings of the words, word classes of the words, and phonetics of the words. The program comprises a selecting step of selecting a predetermined word, contained in a preset idiom read out from the recording means, as a first word, a first readout step of selecting, from the recording means, a word having the pronunciation same as or analogous to the selected first word and being of the same word class as the selected first word, based on the phonetics and the word class of the recorded first word, and reading out the selected word as a second word, a second readout step of selecting the word, determined to have a semantic relationship with the read-out second word, from the recording means, based on the meaning of the recorded second word, and reading out the selected word as a third word, an idiom generating step of generating an idiom corresponding to the read-out idiom except that the selected first word among the words making up the read-out idiom is replaced by the read-out second word, and a sentence generating step of generating a first sentence, composed of the third word and the read-out idiom, with the read-out third word as a subject of the sentence, and for generating a second sentence, composed of the third word and the generated idiom, with the read-out third word as a subject of the sentence.

The present invention also provides a program for having a computer execute a program, which computer controls a sentence generating apparatus including recording means for having a plurality of idioms, a plurality of words, the meanings of the words, word classes of the words, and phonetics of the words. The program comprises a selecting step of selecting a preset word contained in an idiom, read out from the recording means, as a first word, a first readout step of selecting, from the recording means, a word having the pronunciation same as or analogous to the selected first word and being of the same word class as the selected first word, based on the phonetics and the word class of the recorded first word, and reading out the selected word as a second word, a second readout step of selecting a word, determined to have a semantic relationship with the read-out second word, from the recording means, based on the meaning of the recorded second word, and reading out the selected word as a third word, an idiom generating step of generating an idiom corresponding to the read-out idiom except that the selected first word among the words making up the read-out idiom is replaced by the read-out second word, and a sentence generating step of generating a first sentence, composed of the third word and the read-out idiom, with the read-out third word as a subject of the sentence, and for generating a second sentence, composed of the third word and the generated idiom, with the read-out third word as a subject of the sentence.

In the apparatus and method for generating a sentence, according to the present invention, a preset first word among words making up a preset first idiom is replaced by a second word same as or analogous with the first word in pronunciation to generate a second idiom. A first sentence made up by a third word determined to have a semantic relationship with the second word and the first idiom is generated, with the third word as a subject of the sentence. A second sentence made up by the third word and the second idiom is generated, with the third word as a subject of the sentence.

Other objects, features and advantages of the present invention will become more apparent from reading the embodiments of the present invention as shown in the drawings.

BEST MODE FOR CARRYING OUT THE INVENTION

By referring to the drawings, a method and an apparatus for generating a sentence, such as a joke sentence, are explained in detail.

Figure 1:
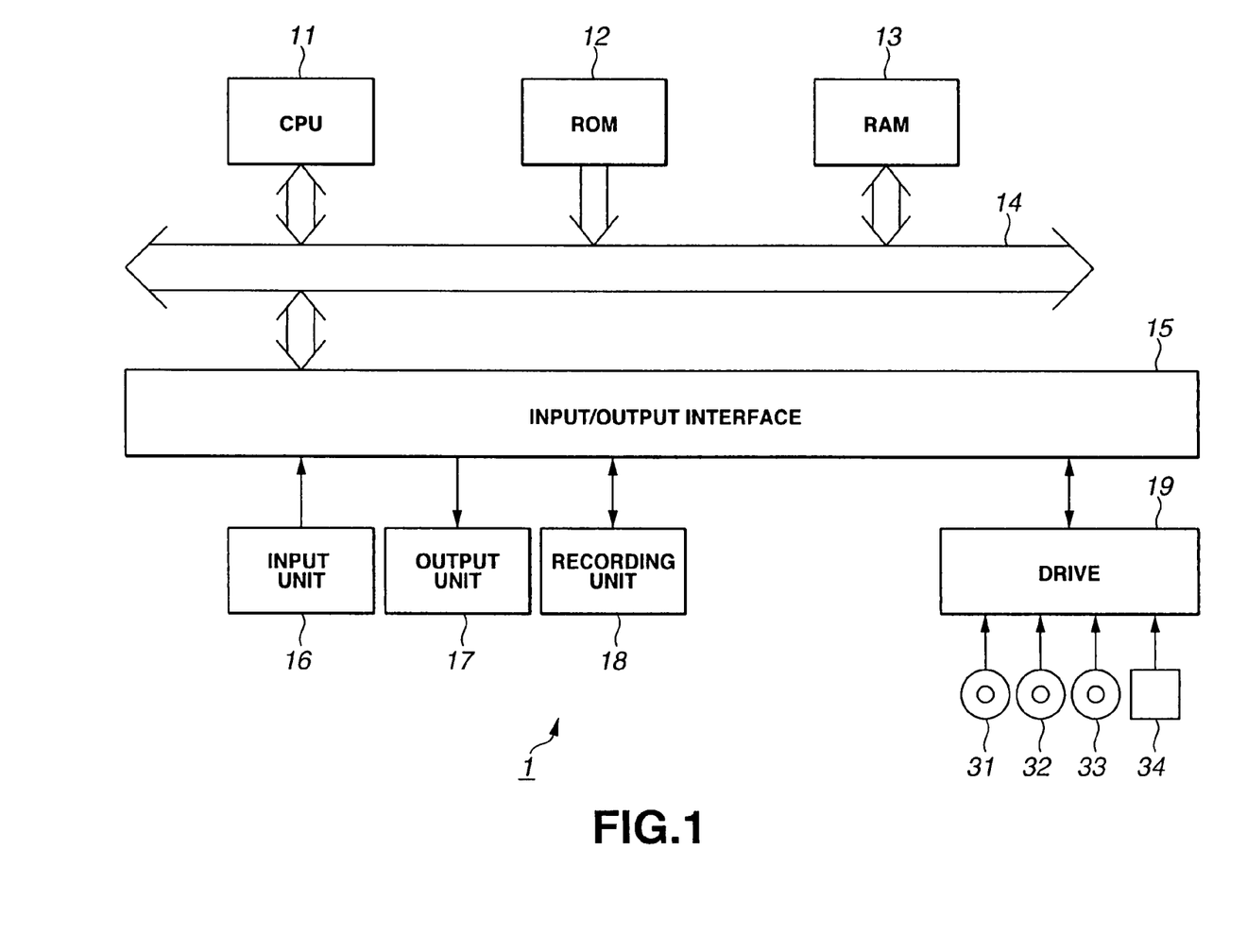
FIG. 1 is a block diagram showing an illustrative structure of a sentence generating apparatus embodying the present invention.

Referring to FIG. 1, a sentence generating apparatus, embodying the present invention, includes a CPU (central processing unit) for executing various processing operations in accordance with a program stored in a ROM (read-only memory) 12 or a program read out from a storage device 18 to a RAM (random access memory) 13. The RAM 13 also stores e.g., data necessary for the CPU 11 to execute various processing operations.

The CPU 11, ROM 12 and the RAM 13 are interconnected over a bus 14. To an input/output interface 15, also connected to this bus 14, are connected an input unit 16, made up by e.g., a keyboard and a mouse, a display, made up by e.g., a CRT or LCD, an output unit 17, such as a loudspeaker, and a storage unit 18, such as a hard disc.

To the input/output interface 15 is connected a drive 19 as necessary. A magnetic disc 31, an optical disc 32, a magneto-optical disc 33 and a semiconductor memory 34 are loaded as shown. A computer program read out therefrom is installed on the storage unit 18 as necessary.

Figure 2:
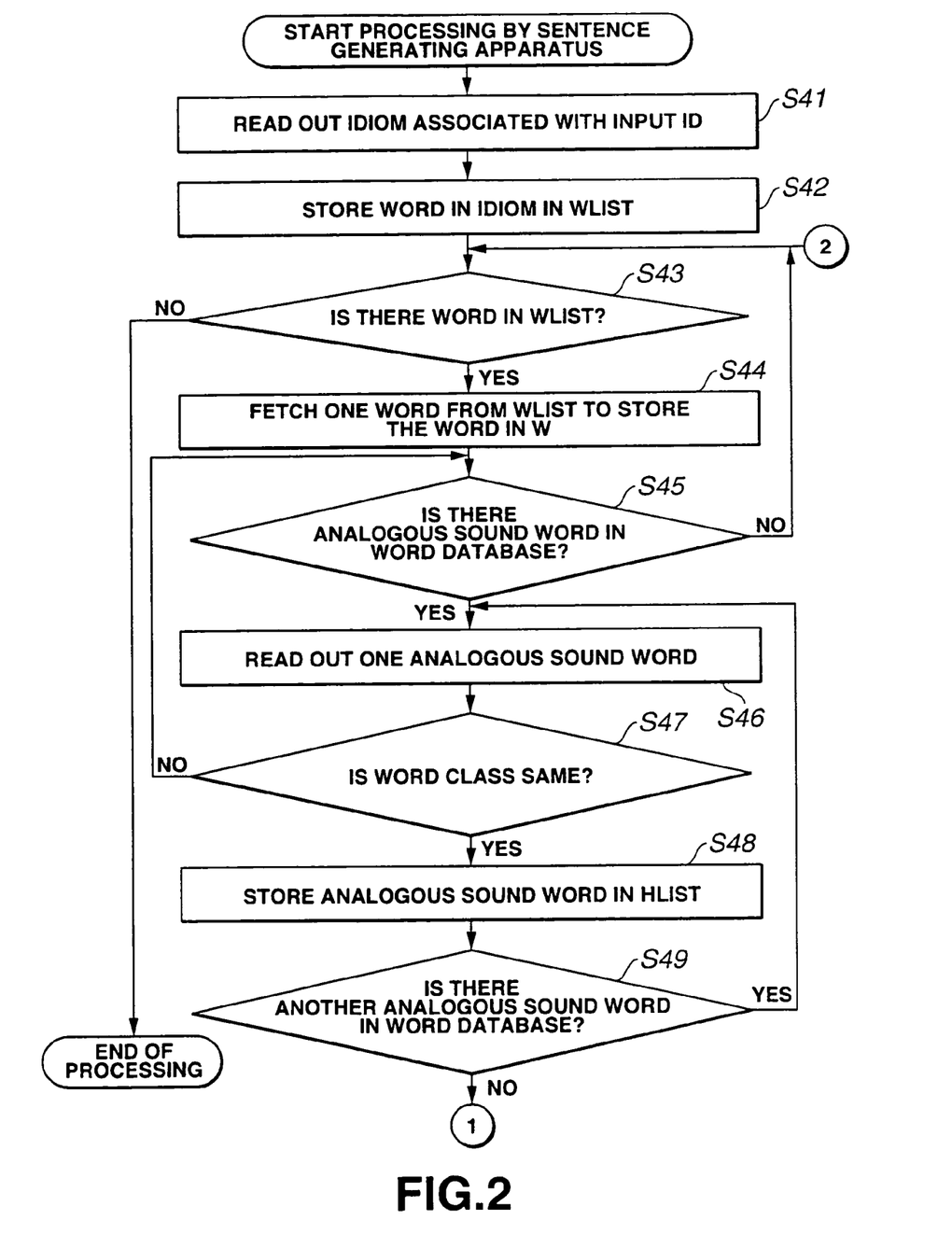
FIG. 2 is a flowchart for illustrating the processing by a sentence generating apparatus embodying the present invention.
Figure 3:
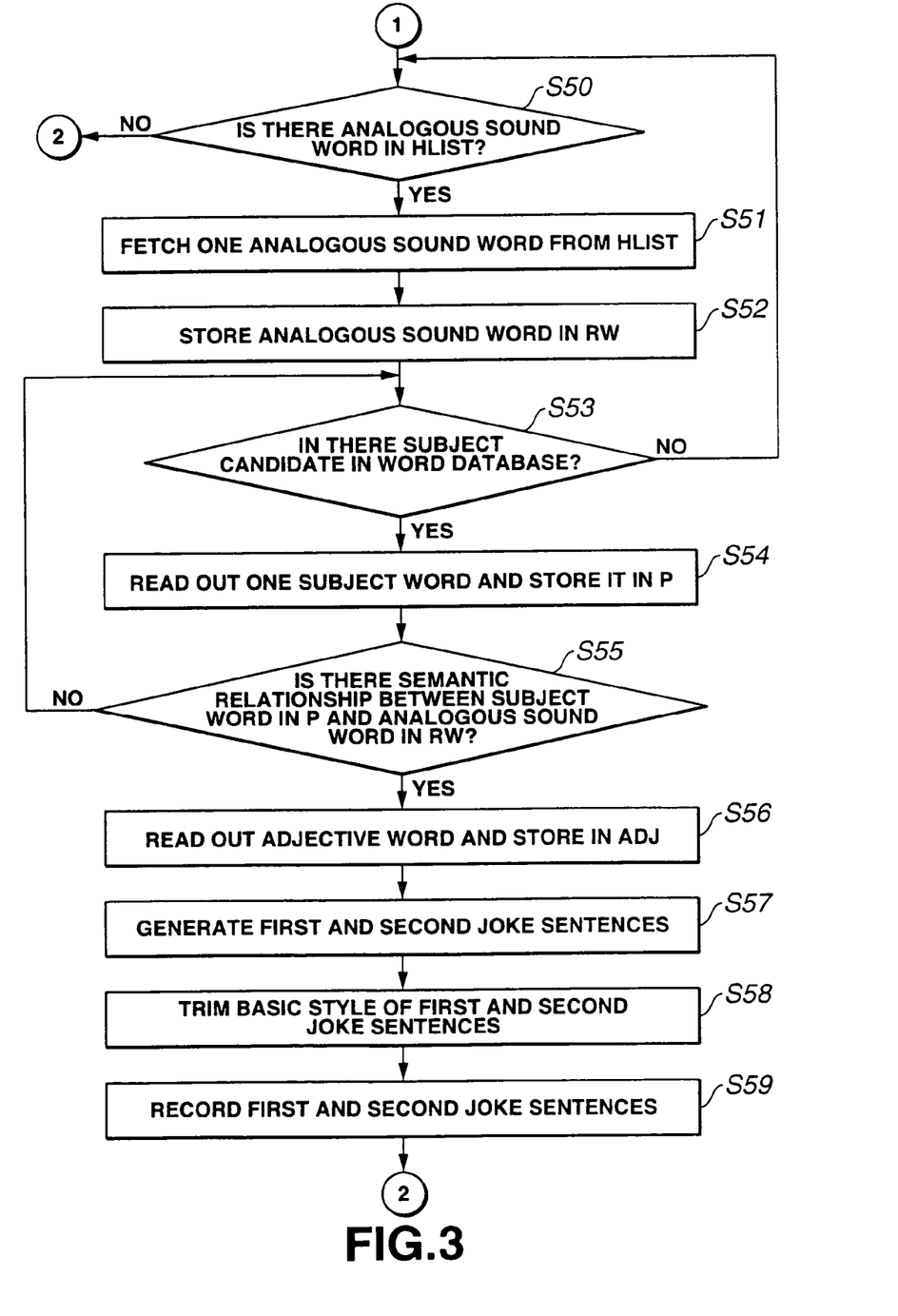
FIG. 3 is a flowchart, continuing to FIG. 2, for illustrating the processing by the sentence generating apparatus embodying the present invention.

Referring to the flowchart of FIGS. 2 and 3, the operation of the sentence generating apparatus, shown in FIG. 1, is now explained. FIGS. 2 and 3 show the processing by a sentence generating apparatus 1.

In the present invention, the joke sentence means a sentence including elements of joke, laughing matter, and humor.

Figure 4:
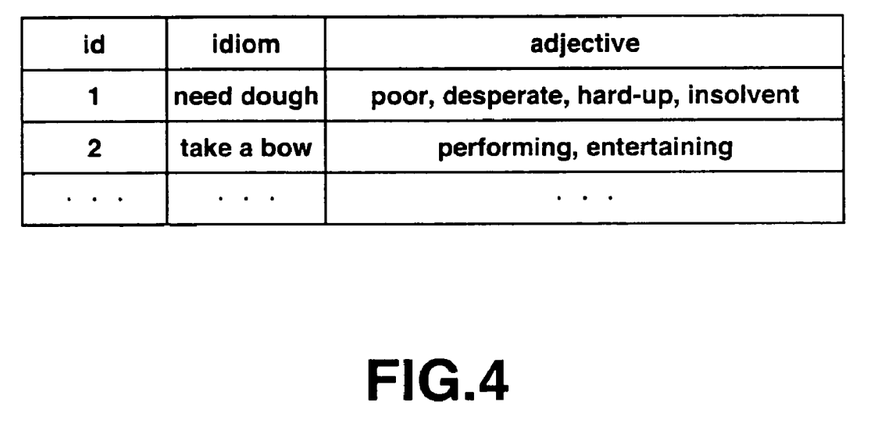
FIG. 4 illustrates an exemplary idiom database recorded in the sentence generating apparatus embodying the present invention.
Figure 5:
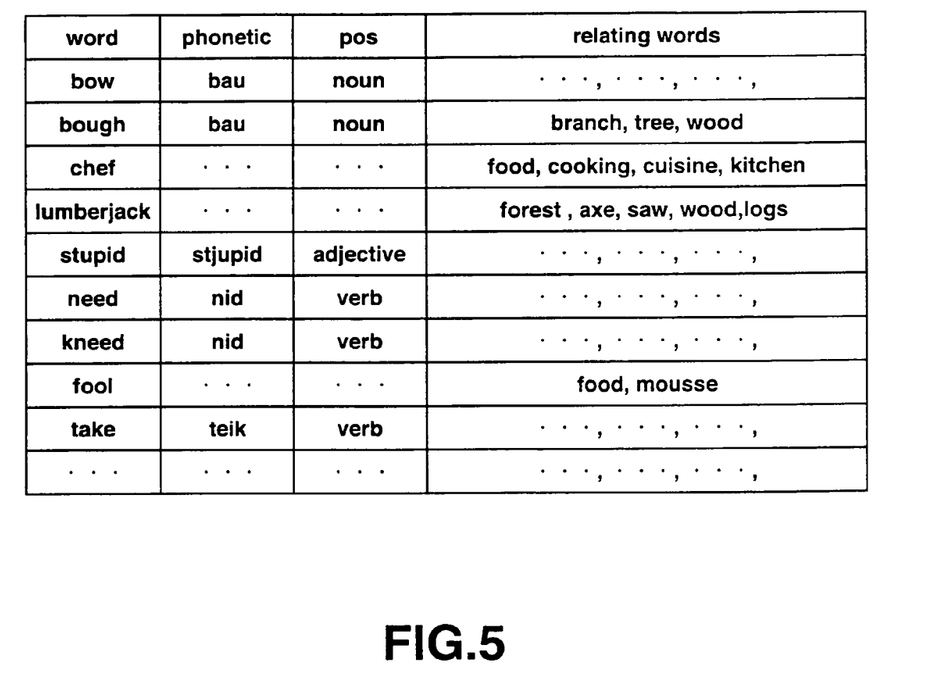
FIG. 5 illustrates an exemplary word database recorded in the sentence generating apparatus embodying the present invention.

In the present embodiment of the sentence generating apparatus 1, an idiom database 71, shown in FIG. 4, and a word database 81, shown in FIG. 5, are pre-stored in the storage unit 18, such that optional data stored in these databases are read out from time to time to the RAM 13, under control by the CPU 11.

Moreover, in the present embodiment of the sentence generating apparatus 1, a [list] is generated on the RAM 13 by the CPU 11. The [list] means a set of [areas] in each of which a word data is recorded. That is, the CPU 11 records an optional word data in an optional [area] in the [list]. The number of [areas] owned by the [list] is determined from one [list] to another. When a new word data is stored in the [list] in the totality of [areas] of which word data have already been recorded, the CPU 11 erases the word data stored in the preset [area] and overwrites the new word data on this [area] for storage therein. The word data stored in the optional [area] of the [list] are read out from time to time to the RAM 13 by the CPU 11.

In the following, this [readout] is termed [fetch]. In this case, the [area] in which the word data fetched has so far been stored becomes void, such that a new word data may be stored in this void [area]. Each [list] will be explained in detail subsequently.

In generating the joke sentence, the user selects an idiom which is to be the basis of the joke sentence.

An idiom means a phrase made up of plural words including verb and which has an intrinsic meaning. In the present embodiment, each idiom is afforded with an intrinsic ID and is stored in the idiom database 71. That is, the idiom database 71 has an item [id] and an item [idiom], and the ID is stored in the item [id], while the idiom is stored in the item [idiom].

Meanwhile, the present embodiment of the idiom database 71 also has an item [adjective]. This will be explained subsequently.

Thus, a user desirous to select an idiom only has to select an ID corresponding to the desired idiom.

Suppose that a user generates a joke sentence using an idiom [take a bow].

As indicated in the idiom database 71, the ID corresponding to [take a bow] is [2]. Thus, the user acts on an input unit 16 of the sentence generating apparatus 1 to input [ID=2].

In a step S41, the CPU 11 reads out data of the idiom associated with the input ID from the item [idiom] of the idiom database 71.

In the present embodiment, since the input [ID] is [2], data [take a bow], associated with [2] of the item [id] of the idiom database 71, is read out.

In a step S42, the CPU 11 generates a [WLIST list] to store the totality of the word data contained in the data of the idiom read out in the processing of step S41. Meanwhile, there is no limitation to the number of word data that may be stored in the [WLIST list]. That is, a number of the [areas] equal to the number of words included in the read-out idioms are generated and a set of these [areas] becomes the [WLIST list].

In the present embodiment, two word data of [take] and [bow] are stored in the [WLIST list].

In a step S43, the CPU 11 verifies whether or not there is word data in the [WLIST list]. If it is determined that there is no word data, that is that the [WLIST list] is void, the processing of the sentence generating apparatus 1 is terminated.

In the step S43, the CPU 11 verifies whether or not there is word data in the [WLIST list] and, if it is determined that there is word data, an optional word data is fetched in a step S44 from the [WLIST list]. The CPU 11 also generates a [W list] to store the fetched word data in the [W list]. Meanwhile, there is one [area] owned by the [W list]. That is, the number of the word data that can be stored in the [w list] is one.

In a step S45, the CPU 11 determines word data having the pronunciation which is the same as or analogous to that of the word data stored in the [W list], by retrieval from the item [word] of the word database 81, based on the item [phonetic (phonetic symbol)] of the word database 81. The word data having the pronunciation which is the same as or analogous to that of the word data stored in the [W list] is termed below an word data of analogous sound.

If, in a step S45, an word data of analogous sound is determined to be not present in the word database 81, the CPU 11 proceeds to a step S43, where the CPU 11 stores another word data stored in the [W list], in the [W list], to retrieve the word data of analogous sound for this word data.

If, in a step S45, a word data of analogous sound is determined to be present in the word database 81, the CPU 11 proceeds to a step S46 where the CPU 11 reads out one word data of analogous sound from the item [word] of the word database 81.

In a step S47, the CPU 11 checks, based on the item [pos (word class)] in the word database 81, whether or not a word class of the word data stored in the [w list] is the same as a word class of the word data of analogous sound read out in the processing of a step S46.

If, in the step S47, it has been found that [the word classes are not the same], the CPU 11 reverts to the step S45 where the CPU 11 retrieves new word data of analogous sound.

If, in the step S47, it has been found that [the word classes are the same], the CPU 11 generates in a step S48 a [HLIST list] to store the word data of analogous sound read out in the processing of the step S46 in the [HLIST list]. Meanwhile, there is to be no limitation to the number of word data stored in the [HLIST list].

In a step S49, the CPU 11 checks whether or not there is further word data of analogous sound in the item [word] of the word database 81. If it is determined that there is such further data, the CPU reverts to the step S46 where the CPU 11 stores the totality of the word data of analogous sound having the same word class as that of the word data stored in the [W list] in the [HLIST list].

If the word data of analogous sound cease to exist in the item of the [word] of the word database 81, that is if the result of check in the step S49 is NO, the CPU proceeds to a step S50.

It is assumed that, in the present embodiment, [take] has been fetched from the [WLIST list] and that [take] has been stored in the [W list]. It is also assumed that no word having the phonetic analogous to the phonetic [teik] of [take] has been recorded in the word database 81. In such case, the word data of analogous sound of [take] is determined to be not present, such that the processing pertinent to [take] is terminated and a word data is fetched from the [WLISI list]. In the present instance, [bow] left in the [WLISI list] is fetched. The data of a word [bough], having a phonetic symbol coincident with the phonetic [bau] of [bow] is read out as word data of analogous sound from the word database 81. In the present embodiment, the CPU 11 retrieves word data having the phonetic which is completely the same as the [bow] as the word data of analogous sound. However, it is also possible to calculate the degree of analogy or closeness of the pronunciation to the [bow] to retrieve word data having the calculated value of the degree of analogy within a preset range as the word data of analogous sound.

The word classes of the [bow] and the [bough] are then checked. It is determined that the [word classes are the same] because the word classes of the [bow] and the [bough] are both a [noun]. As a result, the [bough] and [bow] are stored in the [HLISI list] as being the word data of analogous sound of the same word class as the [bow]. Meanwhile, since no other word data of analogous sound has been recorded in the word database 81, only the [bough] is stored in the [HLISI list].

In a step S50 of FIG. 3, the CPU 11 checks whether or not there is any word data of analogous sound in the [HLISI list] and, if it is determined that there is no word data of analogous sound, the CPU reverts to the step S43 to store the word data of analogous sound for another word data in the [WLISI list] in the [HLISI list].

In the step S50, the CPU 11 verifies whether or not there is any word data of analogous sound in the [HLIST list] and, if it is determined that such word data of analogous sound exists, one word data of analogous sound is fetched in a step S51 from the [HLISI list].

In a step S52, the CPU 11 generates a [RW list] to store the word data of analogous sound, fetched by the processing of step S51, in the [RW list].

Meanwhile, the number of words that can be stored in the [RW list] is one.

In a step S53, the CPU 11 retrieves words, that may become the subject of the so generated joke sentence, from the item of the [word] in the word database 81, to check whether or not there is any word data in the word database 81 which may become a candidate for a subject.

If it is determined in the step S53 that there is no word data, the CPU revelts to the step S50, where the CPU 11 fetches new word data of analogous sound from the [HLISI list].

If it is determined in the step S53 that there is word data, the CPU 11 in a step S54 reads out word data, which may become a candidate for a subject, from the item of the [word] in the word database 81. The CPU 11 generates a [P list] to store the word data as read out in the [P list]. Meanwhile, the number of word data stored in the [P list] is one. The word data stored in the [P list] is termed the subject word data.

In a step S55, the CPU 11 checks, based on the item [relating words (word meaning)] in the word database 81, whether or not there is any semantic relationship between the subject word data stored in the [P list] and the word data of analogous sound stored in the [RW list]. For example, the CPU 11 compares the item [relating words (word meaning)] in the word database 81 associated with the subject word data stored in the [P list] and the item [relating words (word meaning)] in the word database 81 associated with the analogous word data stored in the [RW list]. If there is any word data common to the two items, the CPU determines that there is [semantic relationship].

If it is determined in the step S55 that there is no [semantic relationship] between the subject word data and the analogous word data, the CPU 11 reverts to the step S53 where the CPU retrieves other word data, as a candidate for a subject, from the item of the [word] in the word database 81.

If it is determined in the step S55 that there is the semantic relationship between the subject word data and the analogous word data, the CPU proceeds to a step S56.

In the present embodiment, only the [bough] is stored in the [HLISI list], as discussed above. Thus, the [bough] is fetched and stored in the [RW list] as the analogous word data. It is now assumed that [chef] is read out from the word database 81 as the candidate for a subject and stored in the [P list]. That is, the [chef] becomes the subject word data.

It is then verified whether or not there is any semantic relationship between the analogous word data [bough] and the subject word data [chef]. That is, it is verified whether or not there is any common word data in the item [relating words (word meaning)] in the word database 81. There is no common word data between the item [relating words (word meaning)] of the [bough] and the item [relating words (word meaning)] of the [chef], as indicated in the word database 81. That is, it is now determined that there is no semantic relationship between the [bough] and the [chef].

Another candidate for a subject is selected and it is similarly checked whether or not there is any semantic relationship with the [bough]. It is assumed that [lumberjack] is selected as the candidate for a subject so as to be stored in the [P list]. That is, the [lumberjack] becomes the subject word data. In this case, there is a common word data [wood] in the item [relating words (word meaning)] of the [bough] and the item [relating words (word meaning)] of the [lumberjack], as indicated in the word database 81. As a result, the semantic relationship is determined to exist between the [bough] and the [lumberjack]. A joke sentence is generated by the following processing, with the [lumberjack] stored in the [P list] as the subject word data and with the [bough] stored in the [RW list] as the analogous word data.

That is, the CPU 11 in a step S56 reads out an arbitrary one word data from the item of the [adjective] of the idiom database 71 associated with the ID input by the processing in the step S41. The CPU 11 generates an [ADJ list] to store the read-out word in the [ADJ list]. The word data stored in the [ADJ list] is now termed adjective word data. The number of the word data that can be stored in the [ADJ list] is one.

In the item of the [adjective], the word data of the adjective usable as an idiom associated with the same ID is recorded. That is, by using the word data of this adjective as the joke sentence, there is derived an effect of emphasizing the meaning of the joke of the joke sentence to be generated.

Since the ID of the present instance is [2], the candidate of the adjective is [performing] or [entertaining], as indicated in the item [adjective] in the idiom database 71. It is assumed that the [performing] is selected and stored as an adjective word data in the [ADJ list].

In the next step S57, the CPU 11 generates data of the first joke sentence and data of the second joke sentence, using adjective word data stored in the [ADJ list], analogous word data stored in the [RW list], subject word data stored in the [P list] and data of the idiom associated with the selected ID. It is noted that, as will be explained subsequently, a joke sentence having a dual meaning is generated from these first and second joke sentences as a set.

For example, the following processing is carried out to generate data of the first joke sentence and data of the second joke sentence.

That is, the CPU 11 generates an [IDIOM list] and an [IDIOM' list].

The CPU 11 reads out data of the idiom, associated with the ID selected in the processing of step S41, from the item [idiom] of the idiom database 71, to store the data of the idiom in the [IDIOM list].

The CPU 11 substitutes the word data of analogous sound, stored in the [RW list], for the word data which is the same as the word data stored in the [W list], in the word data making up the so read-out idiom, to generate data of a new idiom, to store the data of the so generated idiom in the [IDIOM' list].

The CPU 11 generates a [list of first joke sentences] and fetches word data from the lists in the order of [ADJ list]→[P list]→[IDIOM list] and arrays the word data in the order the data were fetched to generate data of one sentence to store the data of the generated sentence in the [list of first joke sentences]. Specifically, the [list of first joke sentences] is made up by the [ADJ list]+[P list]+[IDIOM list]. The data of the sentences stored in the [list of first joke sentences] is termed below the first joke sentence data.

In similar manner, the CPU 11 generates a [list of second joke sentences] and fetches word data from the lists in the order of [ADJ list]→[P list]→[IDIOM' list] and arrays the word data in the order the data were fetched to generate data of one sentence to store the data of the generated sentence in the [list of second joke sentences]. Specifically, the [list of second joke sentences] is made up by the [ADJ list]+[P list]+ [IDIOM' list]. The data of the sentences stored in the [list of second joke sentences] is termed below the second joke sentence data.

In the present embodiment, the data of sentences stored in the [list of first joke sentences] and in the [list of second joke sentences] (set of word data) are as follows:
data of the first joke sentence: performing lumberjack take a bow
data of the second joke sentence: performing lumberjack take a bough Meanwhile, there is to be no limitation to the number of word data that may be stored in the [list of second joke sentences].

At the next step S58, the CPU 11 trims the basic style of a sentence. For example, the CPU 11 in the processing of step S57 fetches the data of the first joke sentence, stored in the [list of first joke sentences] in the processing in the step S57, and the data of the second joke sentence, stored in the [list of second joke sentences] in the processing in the step S57, and applied the following [rule of basic style] to the so fetched first and second joke sentences to process the data. The CPU 11 stores the so processed data of the first joke sentence in the [list of first joke sentences], while storing the so processed data of the second joke sentence in the [list of second joke sentences].

Rules of basic style:
(1) A sentence begins with a capital letter;
(2) An additive noun is preceded by "a"; and
(3) For the third person singular present tense, a verb ends with s.

In the present embodiment, the data of the first and second joke sentences are processed as follows:
data of the first joke sentence: A performing lumberjack takes a bow.
data of the second joke sentence: A performing lumberjack takes a bough.

In a step S59, the CPU 21 records the [list of first joke sentences] and the [list of second joke sentences] in the storage unit 18.

After the processing in the step S59, the CPU reverts to the step S43 of FIG. 2 to generate another joke sentence based on the idiom associated with the selected ID. This operation is continued until word data ceases to exist in the [WLISI list], as described above.

The sentence generating apparatus 1 is able to generate a joke sentence having a dual meaning, as discussed previously. Stated differently, the sentence generating apparatus 1 generates the first and second joke sentences having the semantic relationship to each other.

In the present embodiment, the selected idiom as the basis in generating the joke sentences is [take a bow]. This idiom has a meaning: [a player on a stage etc. makes a final bow].

The sentence generating apparatus 1 now selects a [bough (branch of a tree)] in place of the [bow] and concomitantly the [lumberjack] is selected as the subject to generate the first and second joke sentences having the following meanings:
First joke sentence: A performing lumberjack takes a bow.
Meaning of the first joke sentence: An entertaining woodcutter makes a bow on a stage.
Second joke sentence: A performing lumberjack takes a bough.
Meaning of the second joke sentence: An entertaining woodcutter cuts a branch of a tree.

That is, when the first joke sentence is read aloud, not only the meaning of the first joke sentence but also the meaning of the second joke sentence may be imparted to the listener, because [takes a bow] is pronounced similarly to [takes a bough]. That is, the dual meaning may be imparted to the listener, who then feels the sense of humor in the dual meaning.

Moreover, the first joke sentence by itself may impart the sense of humor. That is, if [an actor] is selected as a subject, a first joke sentence:
A performing actor takes a bow.

is generated. The first sentence, thus generated, is a common sentence, from which no sense of humor is imparted.

On the other hand, the subject selected by the sentence generating apparatus 1 is a [lumberjack] (woodcutter), and the generated first sentence conveys the meaning: [an entertaining woodcutter makes a bow on a stage]. By selecting the [woodcutter] as the subject, the first joke sentence may become a humorous sentence.

Additionally, the adjective [performing] has an effect of producing mental association with the basic idiom: [take a bow], thus further intensifying the sense of the joke.

It should be noted that there is no limitation to the method for selecting an adjective for emphasizing the joke. For example, the CPU 11 is able to select the adjective by exploiting the numerical values indicative of the ease in envisioning an image, as obtained from the information of the cognitive psychology.

The sentence generating apparatus 1 mounts the idiom database 71 and the word database 81, as discussed previously. However, there is no limitation to the database(s) mounted.

The above-described sequence of operations may be executed by a hardware or by a software. If the sequence of operations is executed by the software, the program forming the software is installed on a computer loaded on a dedicated hardware, or installed from e.g., a network or a recording medium to for example, a general-purpose personal computer designed to perform various functions based on a program installed thereon.

This recording medium may be formed by a package medium, such as a magnetic disc 31 (inclusive of a floppy disc), an optical disc 32 (CD-ROM (compact disc read-only memory)), a DVD (digital versatile disc), a magneto-optical disc 33 (inclusive of a mini-disc (MD)) or a semiconductor memory 34, having the program and which is distributed for providing the program to the user, by a ROM 12 having the program and which is provided to the user in the state pre-assembled in the main body unit of the apparatus, or by a hard disc mounted in the storage unit 18, as shown in FIG. 1.

According to the present invention, the steps stating the program recorded on the recording medium includes not only the processing carried out chronologically in accordance with the stated sequence but also the processing which is not necessarily processed chronologically but which is executed in parallel or batch-wise.

The present invention is applied not only to the sentence generating apparatus 1 for generating joke sentences, defined as described above, but may be applied to a sentence generating apparatus for generating the two sentences having the common subject and conveying the different meaning for a word selected from a given idiom.

That is, according to the present invention, the semantic relationship with one or both of first and second words may be checked in selecting the subject.

INDUSTRIAL APPLICABILITY

According to the present invention, a second idiom, in which a preset first word of words making up a preset first idiom is replaced by a second word having a pronunciation which is the same as or analogous to the first word and which is of the same word class as the first word, is generated. Using a third word, verified to have the semantic relationship to the second word, as a subject, the first sentence, formed by the third word and the first idiom, is generated, while the second sentence, formed by the third word and the second idiom, is generated, so that there may be generated a joke sentence set having a dual meaning.

The invention claimed is:

1. A sentence generating apparatus comprising:
recording means for storing a plurality of idioms comprising a verb and having an intrinsic meaning, a plurality of words, a list of related words of said words, word classes of said words, and phonetics of said words;
first word selecting means for reading out a first idiom from said recording means and for selecting a word contained in the first idiom as a first word;
second word selecting means for reading out a word stored in said recording means and having a pronunciation that is the same as or analogous to said first word and being of the same word class as said first word, based on the phonetics and the word class of the recorded first word, and for selecting the read-out word as a second word;
third word selecting means for reading out a next word stored in said recording means and having a semantic relationship with the second word, and selecting the next word as a third word,
wherein the third word selecting means determines a semantic relationship of the next word with the second word based on a common word in the list of related words of the next word and the list of relating words of the second word stored in the recording means, and
wherein, when no semantic relationship is found between the next word and the second word, the third word selecting means selects a second next word;
idiom generating means for generating a second idiom by replacing the first word contained in the first idiom with the second word; and
sentence generating means for generating a first sentence comprising the third word as a subject of the first sentence and the first idiom and for generating a second sentence comprising the third word as a subject of the second sentence and the second idiom.

2. The sentence generating apparatus according to claim 1 wherein the sentence generated by said sentence generating means is a joke sentence.

3. The sentence generating apparatus according to claim 1 wherein
said recording means further has a plurality of adjectives pertinent to the recorded respective idioms;
there being provided fourth word selecting means for reading out the adjectives pertinent to the selected idioms from said recording means and for selecting the adjectives as a fourth word;
said sentence generating means generating said first sentence made up by said third word, the first idiom and the fourth word and also generating said second sentence made up by said third word, the second idiom and the fourth word.

4. A method for generating a joke sentence by a sentence generating apparatus that comprises recording means for having a plurality of idioms comprising a verb and having an intrinsic meaning, a plurality of words, a list of related words of said words, word classes of said words, and phonetics of said words, said method comprising:
a first word selecting step of reading out a first idiom from said recording means and for selecting a word contained in the first idiom as a first word;
a second word selecting step of reading out a word stored in the storing means and having the pronunciation same as or analogous to said selected first word and being of the same word class as said first word and selecting the read-out word as a second word;
a third word selecting step of arbitrarily reading out a next word, stored in said recording means and having a semantic relationship with the second word, and selecting the next word as a third word,
wherein the third word selecting step determines a semantic relationship of the third word with the second word based on a common word in the list of related words of the third word and the list of related words of the second word stored in the recording means, and
wherein, when no semantic relationship is found between the next word and the second word, the third word selecting step selects a second next word; and
an idiom generating step of generating a second idiom by replacing the first word contained in the first idiom with the second word; and
a sentence generating step of generating a first sentence comprising the third word as a subject of the first sentence and the first idiom and generating a second sentence comprising the third word as a subject of the second sentence and the second idiom.

5. The sentence generating method according to claim 4 wherein the sentence generated by said sentence generating step is a joke sentence.

6. A sentence generating apparatus for generating a sentence comprising:
first word selecting means for selecting a first word from a preset medium;
second word selecting means for selecting a second word having the pronunciation same as or analogous to the first word selected by said selecting means and being of the same word class as said first word;
third word selecting means for selecting a next word as a subject by arbitrarily selecting a next word, determining whether the next word has a semantic relationship with the second word and reading out the next word as a third word,
wherein the third word selecting means determines a semantic relationship of the next word with the second word based on a common word in a word description stored in the recording means, and
wherein, when no semantic relationship is found between the next word and the second word, the third word selecting means selects a second next word; and sentence generating means for generating a first sentence comprising said first word and the third word as a subject of the first sentence, and for generating a second sentence comprising said second word in substitution for said first word and said third word as a subject of the second sentence.

7. The sentence generating apparatus according to claim 6 wherein said sentence is a joke sentence.

8. A recording medium for having a computer-readable program for a sentence generating apparatus that comprises recording means for having a plurality of idioms comprising a verb and having an intrinsic meaning, a plurality of words, a list of related words of said words, word classes of said words, and phonetics of said words, said program comprising:

- a first word selecting step of reading out a first idiom from said recording means and for selecting a word contained in the first idiom as a first word;
- a second word selecting step of reading out a word stored in the storing means and having the pronunciation same as or analogous to said selected first word and being of the same word class as said first word and selecting the read-out word as a second word;
- a third word selecting step of arbitrarily reading out a next word stored in said recording means and having a semantic relationship with the second word and selecting the next word as a third word,
- wherein the third word selecting step determines a semantic relationship of the third word with the second word based on a common word in the list of relating words of the third word and the list of relating words of the second word stored in the recording means,
- wherein, when no semantic relationship is found between the next word and the second word, the third word selecting step selects a second next word; and
- an idiom generating step of generating a second idiom by replacing the first word contained in the first idiom with the second word; and
- a sentence generating step of generating a first sentence comprising the third word as a subject of the first sentence and the first idiom and generating a second sentence comprising the third word as a subject of the second sentence and the second idiom.

* * * * *